(12) United States Patent
Schneider et al.

(10) Patent No.: US 11,660,549 B2
(45) Date of Patent: May 30, 2023

(54) PENDULUM UNIT AND WAVE PENDULUM ASSEMBLY

(71) Applicants: BTS Trading GmbH, Uetersen (DE); Bernd Torsten Schneider, Uetersen (DE)

(72) Inventors: Bernd Torsten Schneider, Uetersen (DE); Stefan Wesenberg, Elmshorn (DE)

(73) Assignees: BTS Trading GmbH, Uetersen (DE); Bernd Torsten Schneider, Uetersen (DE)

( * ) Notice: Subject to any disclaimer, the term of this patent is extended or adjusted under 35 U.S.C. 154(b) by 719 days.

(21) Appl. No.: 16/528,874

(22) Filed: Aug. 1, 2019

(65) Prior Publication Data

US 2020/0324218 A1  Oct. 15, 2020

(51) Int. Cl.
*A63H 33/26* (2006.01)
*H01F 7/02* (2006.01)
*H01F 7/20* (2006.01)

(52) U.S. Cl.
CPC .......... *A63H 33/26* (2013.01); *H01F 7/0242* (2013.01); *H01F 7/206* (2013.01)

(58) Field of Classification Search
CPC ....... A63H 33/26; H01F 7/0242; H01F 7/206; A63F 7/0088; A63F 7/068
See application file for complete search history.

(56) References Cited

U.S. PATENT DOCUMENTS 3,118,669 A * 1/1964 Merrill .................. A63H 33/26
                                              273/447
3,707,290 A * 12/1972 Birnkrant ............... A63F 9/181
                                              273/161

(Continued)

FOREIGN PATENT DOCUMENTS

CN     202473043 U  * 10/2012
CN     204637543 U  *  9/2015

OTHER PUBLICATIONS

Translation CN202473043U (Year: 2012).*

(Continued)

*Primary Examiner* — Eugene L Kim
*Assistant Examiner* — Alyssa M Hylinski
(74) *Attorney, Agent, or Firm* — George G. Wang; Bei & Ocean

(57) ABSTRACT

The present disclosure relates to the field of decor items, and more particularly relates to a pendulum unit and a wave pendulum assembly based on the pendulum unit, wherein the wave pendulum assembly comprises a frame and a plurality of first magnetic bodies, respective first magnetic bodies being connected to the frame via strings and being hung in the air; second magnetic bodies, the amount of which is identical to that of the first magnetic bodies, the second magnetic bodies being fixedly disposed below the first magnetic bodies in a one-to-one correspondence; in the first magnetic bodies and the second magnetic bodies, at least one party may generate magnetism when being energized, such that at least one of the first magnetic body and the second magnetic body may generate magnetism when being energized, such that the first magnetic body may swing periodically in the air under a magnetic action between the first magnetic body and the second magnetic body.. The wave pendulum assembly provided by the pres- (Continued)

ent disclosure has beneficial effects such as a simple structure, a good reliability, and an appeal for viewing.

17 Claims, 10 Drawing Sheets

(56) References Cited

U.S. PATENT DOCUMENTS

| | | | | |
|---|---|---|---|---|
| 4,011,674 A | * | 3/1977 | Jacobson | A63H 33/26 |
| | | | | 446/131 |
| 4,728,871 A | * | 3/1988 | Andrews | H02K 33/10 |
| | | | | 318/130 |
| 4,874,346 A | * | 10/1989 | Wachspress | A63H 33/26 |
| | | | | 310/90.5 |
| 5,026,314 A | * | 6/1991 | Samson | A63H 33/26 |
| | | | | 446/133 |
| 5,052,968 A | * | 10/1991 | Lodrick, Sr. | A63H 33/26 |
| | | | | 446/134 |
| 5,881,679 A | * | 3/1999 | Hann | A01K 15/025 |
| | | | | 119/707 |
| 8,230,625 B2 | * | 7/2012 | Pentland | G09F 19/10 |
| | | | | 40/427 |
| 2008/0208388 A1 | * | 8/2008 | Pentland | G09F 19/02 |
| | | | | 700/213 |
| 2017/0282089 A1 | * | 10/2017 | Wang | B25J 9/1617 |

OTHER PUBLICATIONS

Translation CN204637543U (Year: 2015).*
How to make Electromagnetic Pendulum Swing. Dec. 3, 2018, <https://www.youtube.com/watch?v=9ZwOvOVIIjg> (Year: 2018).*

* cited by examiner

PENDULUM UNIT AND WAVE PENDULUM ASSEMBLY

FIELD OF THE INVENTION

The present disclosure relates to the field of decor items, and more particularly relates to a pendulum unit and a wave pendulum assembly based on the pendulum unit.

BACKGROUND

A simple pendulum is a device that may produce a back-and-forth swing, where one end of a massless rod or a non-stretchable flexible string is suspended from a fixed point in a gravity field, and the other end thereof is fixedly tied with a massive bob. A bob swing restricted only to a vertical plane constitutes a planar simple pendulum; while a bob swing not limited only to a vertical plane constitutes a spherical simple pendulum.

Due to its characteristic of back-and-forth motion, the simple pendulum may easily cause one to enter a mild hypnotic state when his/her attention is concentrated on it, thereby functioning to relieve fatigue and alleviate pressure. Therefore, the simple pendulum and its relevant derivatives are widely used as landscaping decors and desktop decors.

Currently, derivatives of the simple pendulum for purposes of desktop decoration mainly include Newton's cradle, which is also referred to as Newton's balls or Executive Ball Clicker. The Newton's Cradle is a desktop demonstration device proposed by the French physicist Edme Mariotte as early as in 1676. In the Newton's Cradle, a plurality of spheres with an identical mass are fixed by strings and arranged densely with each other. When a sphere at either side swings back and forth to strike other densely arranged spheres, the sphere at the opposite side will be bounced out under the action of momentum conservation.

However, motions of existing simple pendulums for desktop decoration purposes, such Newton's cradles or other derivatives, need to be actuated manually, and their motion processes are also very dull, such that they have limited effects of fatigue relief and pressure mitigation.

When used as landscaping decorations, simple pendulums in spacious scenarios such as squares, lawns, and lobbies are mostly actuated by mechanical transmission, such that their motion patterns are also very monotonic and unappealing. Besides, mechanical transmission systems are generally highly complex, costly, and easily damageable or malfunctional.

SUMMARY OF THE PRESENT INVENTION

To solve all or at least part of the technical problems above, a pendulum unit is provided in an embodiment of the present disclosure, comprising: a frame;

a first magnetic body, the first magnetic body being connected to the frame via a string and being hung in the air; and a second magnetic body fixedly disposed below the first magnetic body; wherein at least one of the first magnetic body and the second magnetic body may generate magnetism when being energized, such that the first magnetic body may swing periodically in the air under a magnetic action between the first magnetic body and the second magnetic body.

An embodiment of the present disclosure further provides a wave pendulum assembly, comprising:

a frame;

a plurality of first magnetic bodies, respective first magnetic bodies being connected to the frame via strings and being hung in the air; and second magnetic bodies, the amount of which is identical to that of the first magnetic bodies, the second magnetic bodies being fixedly disposed below the first magnetic bodies in a one-to-one correspondence; wherein in the first magnetic bodies and the second magnetic bodies, at least one party may generate magnetism when being energized, such that the first magnetic bodies may swing periodically in the air under a mutual magnetic action between the first magnetic bodies and the second magnetic bodies.

In the present disclosure, swinging of each first magnetic body is controlled by means of energizing, which further implements automatic control of the wave pendulum assembly. Compared with the prior art of actuating the swing by manually pushing a sphere to swing, the present disclosure realizes long-time and uninterrupted motion of the first magnetic bodies without a need of repeated manual intervention, thereby enhancing the convenience. Compared with pushing the first magnetic bodies to motion by means of mechanical transmission, the present disclosure offers a simple structure, a convenient implementation, a low cost, a long service life and a good robustness.

Moreover, by controlling the magnitude of current upon energizing, the wave pendulum assembly of the present disclosure enables automatic change of the amplitude, frequency, and direction of the motion of each first magnetic body, forming a more enticing swing pattern, causing the motion process of the wave pendulum assembly not dull, providing a better effect of fatigue relief and pressure alleviation, and enhancing its appeal.

BRIEF DESCRIPTION OF THE DRAWINGS

To better elucidate the technical solutions in the embodiments of the present disclosure or in the prior art, the drawings used for describing the embodiments or the prior art will be briefly introduced below. It is apparent that the drawings as described only relate to some embodiments of the present disclosure. To those skilled in the art, other drawings may be derived based on these drawings without exercise of inventive work; technical features, connection relationships, and even process steps not mentioned herein may also be derived based on these drawings.

Figure 1:
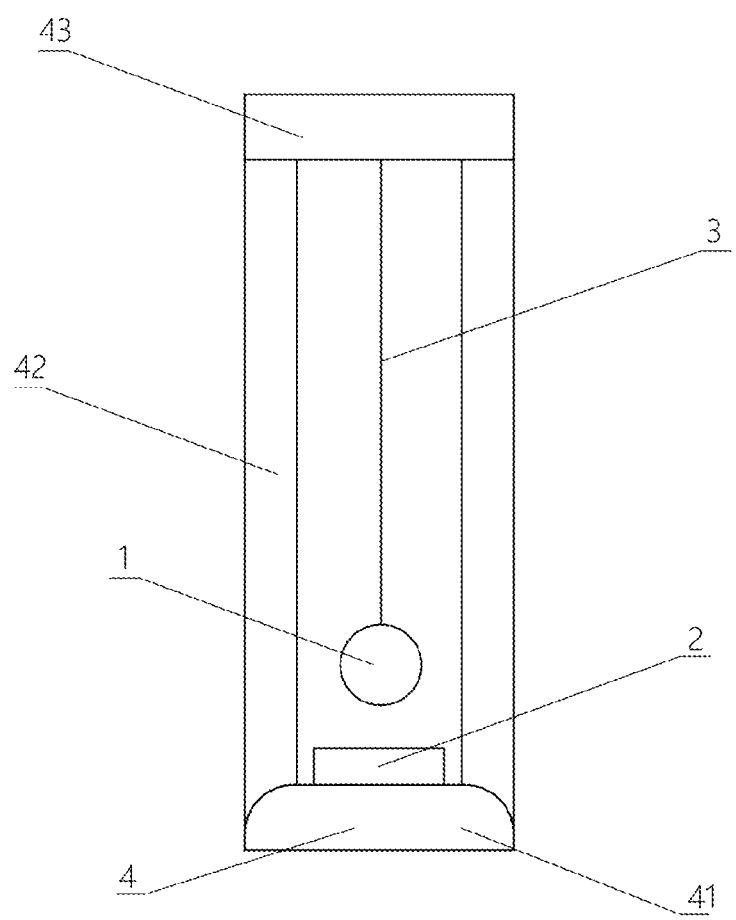
FIG. 1 is a planar schematic diagram of a pendulum unit according to a first embodiment of the present disclosure.

Explanations of the Reference Numerals:

1—first magnetic body; 11—housing; 12—channel; 13—electromagnetic device; 14—wire connector; 15—lead;
2—second magnetic body; 21—left electromagnet; 22—right electromagnet; 23—permanent magnet;
3—string;
4—frame; 41—pedestal; 42—support pillar; 43—beam; 44—battery compartment; 45—cable;
5—conductive connector; 51—line realignment device; 511—electrically conductive reed;
512—bolt-nut assembly; 52—electrically conductive contact.

DETAILED DESCRIPTION

To make the objects, technical solutions, and advantages of the embodiments of the present disclosure much clearer, the technical solutions in the embodiments of the present disclosure will be described clearly and comprehensively with reference to the accompanying drawings of the embodiments of the present disclosure; apparently, the embodiments as described are only part of the embodiments of the present disclosure, rather than all of them. All other embodiments obtained by those skilled in the art without exercise of inventive work based on the embodiments in the present disclosure shall fall within the protection scope of the present disclosure.

The present disclosure discloses a pendulum unit and a wave pendulum assembly based on the pendulum unit.

Embodiment I

The Inventor of the present disclosure found that in the prior art, irrespective of a simple pendulum or a Newton's cradle, they all require an external force to exert an initial gravitational potential energy to swinging spheres such that the swinging spheres may motion under the momentum converted from the gravitational potential energy. During pendulum motion of the prior art, energy is constantly consumed by air friction as well as during transmission of swinging sphere, till being completely consumed; and the motion amplitude of swinging spheres will be gradually diminished; besides, the motion procedure of the swinging spheres is also very monotonic. After the energy is completely consumed, a further external force is needed to give the swinging spheres a new gravitational potential energy. Therefore, to maintain continued motion of the pendulum in the prior art, continuous manual intervention is needed, which is much inconvenient to manipulate and fails to provide a desired effect of fatigue relief and pressure mitigation. Without manual intervention, the prior art would need a complex mechanical transmission as dynamic source; consequently, besides a high manufacturing cost, this further poses a high demand on properties of the mechanical transmission structure such as rust-proof, anti-corrosion, dust-proof, sand-proof, and water-proof so as to cope with outdoor scenarios exposed to uncertain weathers. To handle severe display environments, the mechanical transmission structure needs to pay dearly; besides, it has serious drawbacks such as a high system complexity and a short service life.

In view of the above, a pendulum unit is provided in a first embodiment of the present disclosure, as shown in FIG. 1, which comprises:

a frame 4;

a first magnetic body 1, the first magnetic body 1 being connected to the frame 4 via a string 3 and hung in the air; and a second magnetic body 2 fixedly disposed below the first magnetic body 1; wherein at least one of the first magnetic body 1 and the second magnetic body 2 may generate magnetism when being energized, such that the first magnetic body 1 may swing periodically in the air under a magnetic action of the first magnetic body and the second magnetic body.

In an embodiment, the frame 4 may preferably comprise:

a pedestal 41 on which the second magnetic body 2 is disposed;

a beam 43 disposed above the pedestal 41, wherein the first magnetic body 1 is connected to the beam 43 via the string 3; and a support pillar 42 connected on the pedestal 41 to support the beam 43. The support pillar 42 may be configured separately at the left and right sides, as shown in FIG. 1, or configured to be one at a single side. To the allowed extent of bearing safety, the beam 43 and the support pillar 42 may be integrally formed under a continuous curvature, so as to form an arcuate support structure.

It is particularly noted that the shape of the support pillar 42 is not limited to a single straight-line profiled shape. In practice, it may be formed into a stereoscopic structure; when viewed from one side of the pendulum unit towards the first magnetic body 1, different viewing angles may present different viewing effects. Therefore, the support pillar 42 as adopted may be presented in various patterns such as an inverse "V" pattern, an arched door pattern, etc. The support pillar 42 may also be made of a transparent or frosted material.

The pedestal 41 may be formed with a housing into which the second magnetic body 2 is accommodated. The frame 4 may form a support to the pendulum unit, such that the first magnetic body 1 may swing therein.

In this embodiment, illustration will be made with an example in which the second magnetic body 2 may generate magnetism when being energized. In other words, the second magnetic body 2 itself may be an electromagnet, or the second magnetic body 2 is provided with an electromagnet inside. Besides, the first magnetic body 1 may be a common magnet or configured as a device that may generate magnetism when being energized.

To simplify configuration of the gravitational center of the first magnetic body 1, the first magnetic body 1 may be formed as a spherical body or a regular polyhedron. When the spherical shape is adopted, an air friction subjected to the first magnetic body 1 may also be reduced. Of course, to provide more versatile user experience, the first magnetic body 1 may also assume some other irregular shapes, which does not constitute a limitation to the technical object of the present disclosure.

It is noted that the pendulum unit according to an embodiment of the present disclosure may control the circuit via an external control circuit, or may include a control circuit in itself, wherein the control circuit may comprise:

a converter module that is electrically connected to the first magnetic body 2;

and a control module that is in communicative connection with the converter module.

In an embodiment, the control module may change the current in the first magnetic body 1 and/or the second magnetic body 2 through a preset control logic.

Particularly, the way of changing the current includes, but is not limited to, changing the current magnitude and/or current direction so as to flexibly implement automatic control of the pendulum unit.

Further, a memory module may be further provided. The memory module is in communication with the control module and may be used for storing control logic. By loading the control logic into the memory module, the user may autonomously edit or adapt the swing style of the first magnetic body 1, so that the pendulum unit provides more fun to play, thereby improving user experience.

Moreover, the present disclosure may implement different patterns of periodic swing based on settings of the connection between the string 3 and the frame 4. For example, when the string 3 is a single string shown in FIG. 1 and the string 3 and the frame 4 are connected via a single connection point, the first magnetic body 1 may sway in a fashion of circle drawing above the second magnetic body 2. However, when the string 3 is connected to the frame 4 via a revolving shaft, the first magnetic body 1 may swing laterally (front-rearward) as the revolving shaft revolves.

Further, illustration will be made with an example where the first magnetic body 1 is a permanent magnet. Because the position of the first magnetic body 1 is fixed relative to the second magnetic body 2, a magnetic pole of the first magnetic body 1 facing the direction of the second magnetic body 2 is also relatively fixed.

When current in one direction is introduced in the second magnetic body 2 to cause the magnetic poles of the second magnetic body 2 and the first magnetic body 1 to be opposite in a same direction, the first magnetic body 1 and the second magnetic body 2 repel each other. Because the second magnetic body 2 is fixedly disposed below the first magnetic body 1; the first magnetic body 1 starts swinging under a push of this repulsive force. By changing the direction and magnitude of the current in the second magnetic body 2 at appropriate time, the swinging action of the first magnetic body 1 may be controlled. For example, when the first magnetic body 1 is located at a position with a maximum amplitude, the first magnetic body 1 and the second magnetic body 2 are attracted to each other by changing the current direction; when the first magnetic body 1 is located at a lowest point, the first magnetic body 1 and the second magnetic body 2 repel each other by changing the current direction again; in this way, energy may be constantly replenished for the motion of the first magnetic body 1, and the amplitude of the first magnetic body 1 may be increased. For another example, the first magnetic body 1 and the second magnetic body 2 may be attracted to each other by directly changing the direction of current, and when this state is maintained, the first magnetic body 1 may quickly stop swinging.

When the first magnetic body 1 may generate magnetism in the same way, current in the first magnetic body 1 and the second magnetic body 2 may be adjusted simultaneously to further increase the motion complexity of the first magnetic body 1.

It is noted that the pendulum unit may further comprise a power supply module, the power supply module supplying power to power-consuming components of the pendulum unit through any one of solar energy, wind energy, grid power or a combination thereof.

For example, a battery module may be arranged inside the pendulum unit and a solar panel may be arranged on the top thereof, such that in fine days, the power generated by the solar energy actuates the first magnetic body 1 to motion and meanwhile charges the battery module, while in rainy days, the battery module discharges to actuate the first magnetic body 1 to motion. When connected to the grid power, the extra generating capacity of the solar panel may also be integrated into the grid power to enhance energy utilization. Of course, implementation of the technical objective of the present disclosure will not be affected if the power is only supplied by solar energy, without arranging the battery module.

In the present disclosure, swing of the first magnetic body 1 is controlled by energizing, which further implements automatic control of the pendulum unit.

Compared with the prior art where the swing is actuated by manually pushing the swinging spheres, the present disclosure needs no repeated manual intervention to realize long-time and uninterrupted motion of the first magnetic bodies, thereby enhancing the convenience. Further, compared with pushing the motion of the first magnetic body 1 through mechanical transmission, the present disclosure only needs to arrange a pair of mutually cooperating magnetic bodies, so that multiple variations of motion speeds and motion patterns may be realized by simple electrical control, which reduces the structural complexity to a great extent, and provides a more convenient implementation, a lower cost, a longer service life, and higher robustness.

Moreover, by controlling the magnitude of current upon energizing, the pendulum unit of the present disclosure may autonomously change the amplitude, frequency, and direction of the motion of the first magnetic body 1, thereby forming versatile interesting swinging patterns, so that the motion procedure of the pendulum unit is not dull, a better effect of fatigue relief and pressure alleviation is generated, and its appeal is enhanced.

Embodiment II

Figure 2:
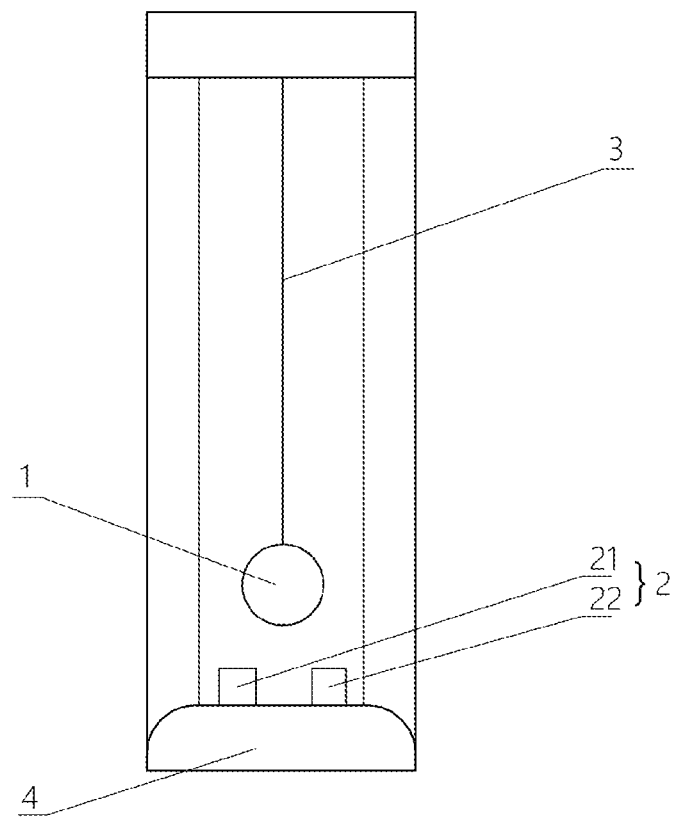
FIG. 2 is a planar schematic diagram of a pendulum unit according to a second embodiment of the present disclosure.

A second embodiment of the present disclosure provides a pendulum unit; the pendulum unit according to the second embodiment is a further improvement of that in the first embodiment. The main improvement lies in that the second magnetic body 2 comprises two electromagnets, i.e., a left electromagnet 21 and a right electromagnet 22, respectively, as shown in FIG. 2.

Particularly, the two electromagnets are disposed at two sides below the first magnetic body 1, respectively. They both may be energized through separate control circuits or through branch circuits of a general control circuit.

When the second magnetic body 2 is configured as two separate electromagnets, the swinging manner of the first magnetic body 1 may be controlled by tuning the currents of different electromagnets. For example, when the left electromagnet 21 and the first magnetic body 1 repel each other while the right electromagnet 22 and the first magnetic body 1 are attracted with each other, the first magnetic body 1 at the lowest point will quickly swing to the right; vice versa. Besides, when the left electromagnet 21 and the right electromagnet 22 are both attracted mutually with the first magnetic body 1, the first magnetic body 1 may stop motioning. Furthermore, when the left electromagnet 21 and the right electromagnet 22 are both repellant with the first magnetic body 1, the first magnetic body 1 may bounce.

Additionally, when the second magnetic body 2 is configured as two separate electromagnets, the first magnetic body 1 may be caused only to sway laterally without adjusting the setting of the string 3 when the string 3 and the frame 4 are connected via a single connection point, thereby simplifying the connection structure of the string 3.

Embodiment III

In an embodiment of the present disclosure, a source for generating an initial force of pushing the first magnetic body 1 to motion may be the magnetism generated by the second magnetic body 2 when being energized, or the magnetism generated by the first magnetic body 1 when being energized.

In the case that the first magnetic body 1 may generate magnetism, a power source of the first magnetic body 1 may be a battery disposed inside the first magnetic body 1. However, if a battery is provided inside the first magnetic body 1, the internal structure of the first magnetic body 1 will become more complex.

In view of the above, a third embodiment of the present disclosure provides a pendulum unit; the pendulum unit according to the third embodiment is a further improvement of the pendulum unit according to the first or second embodiment. The main improvement lies in that in the third embodiment of the present disclosure, the string 3 may conduct electricity, such that the first magnetic body 1 may generate magnetism when being energized.

Particularly, the string 3 may conduct electricity via at least one electrically conductive cable inside the string 3 or is directly made of an electrically conductive material. For example, the string 3 may be directly made of steel, copper or some metal alloy materials.

By conducting the string 3 to an external battery, a weight of the first magnetic body 1 may be reduced, the internal structure of the first magnetic body 1 may be simplified, and the cost may be lowered.

Figure 3:
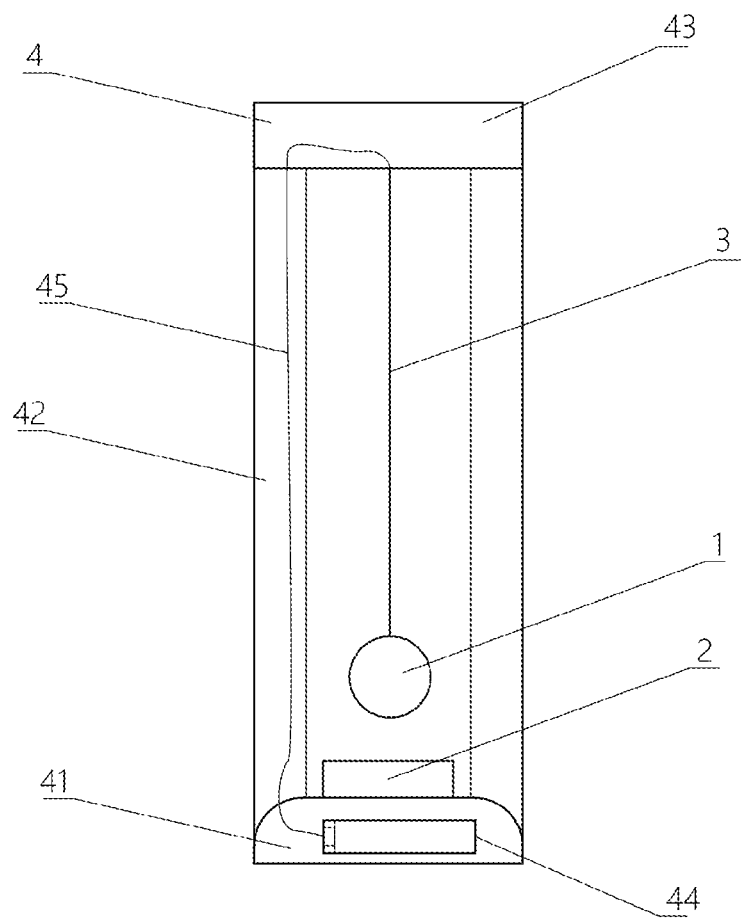
FIG. 3 is a planar schematic diagram of a pendulum unit according to a third embodiment of the present disclosure.

Preferably, as shown in FIG. 3, the pendulum unit may further comprise:

a battery compartment 44 that is disposed inside the pedestal 41, for accommodating a battery module; and a cable 45 that is electrically connected to a battery module and a string 3, the cable 45 being at least partially disposed inside a support pillar 42.

Particularly, the battery may be a lithium battery, a dry battery, or some other common batteries; further, a battery compartment 44 may be provided inside the frame 4, particularly inside the pedestal 41 of the frame 4, and the battery is disposed inside the battery compartment 44. By disposing the battery in the pedestal 41, it is beneficial for reasonable counterweight arrangement of the pendulum unit to prevent toppling of the pendulum unit. Of course, the battery might not be arranged; instead, the power is supplied via AC input.

It is particularly noted that when magnetism is needed, it is always envisaged to energize the second magnetic body 2 to generate magnetism while setting the first magnetic body 1 as permanent magnet. In this way, the structure of the first magnetic body 1 may be simplified. When the first magnetic body 1 is always in a motion state, a simpler structure causes the pendulum unit easier to be manufactured.

However, this arrangement is more suitable for a small-sized pendulum unit. When the pendulum unit is applied to a large decor, in order to enable the first magnetic body 1 to implement a simple pendulum motion, the options may include: providing a second magnetic body 2 including two electromagnets, or changing the connecting structure between the first magnetic body 1 and the frame 4, e.g., setting the connecting structure as a revolving shaft. Arrangement of the two electromagnets will cause the cost to rise, while setting the connecting structure as a revolving shaft poses a high demand on the bearing of the revolving shaft structure, which also increases the cost.

However, an embodiment of the present disclosure innovatively causes the first magnetic body 1 to be able to generate magnetism when being energized, so that with the first magnetic body 1 as an electromagnet capable of generating magnetism when being energized and with a string 3 to conduct the current, it is unnecessary to arrange a battery on the first magnetic body 1; in this way, the structure of the first magnetic body 1 is not complex. Further, as it is only needed to provide on electromagnet on the first magnetic body 1 and the first magnetic body 1 and the frame 4 may be connected in any manner, the structure is significantly simplified, the cost is lowered, and the service life is prolonged.

Embodiment IV

A fourth embodiment of the present disclosure provides a pendulum unit, which is a further improvement of that in the third embodiment. The main improvement lies in providing a more appropriate arrangement of permanent magnets.

Figure 4:
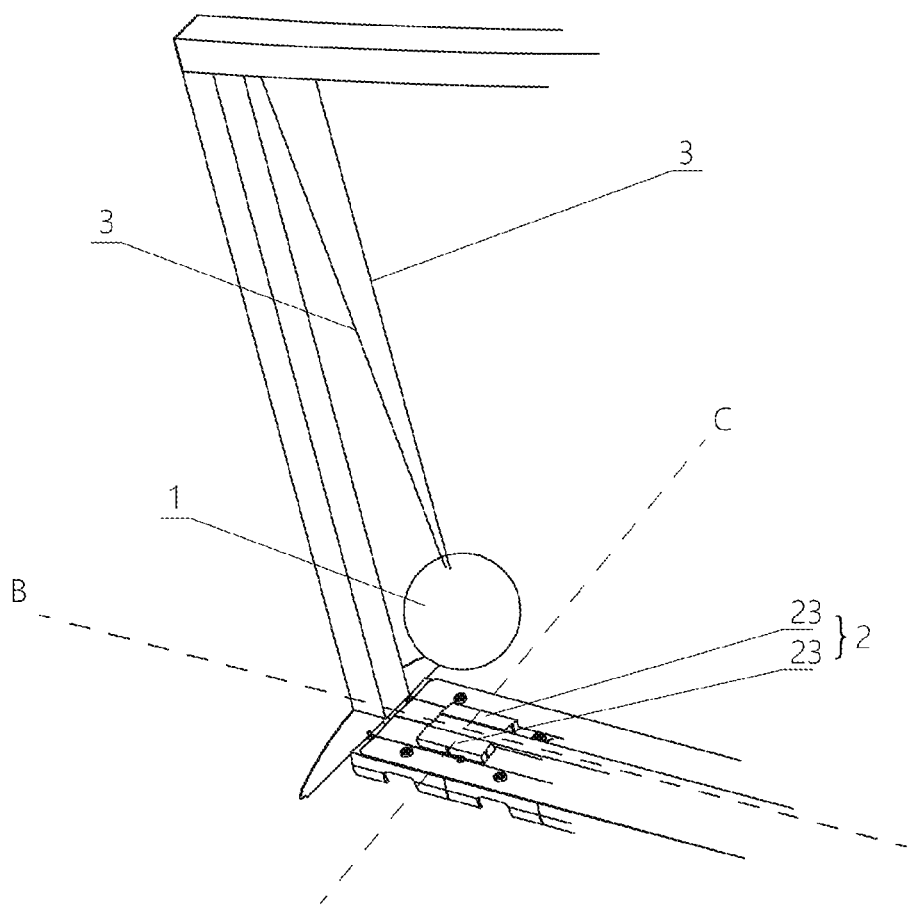
FIG. 4 is a stereoscopic schematic diagram of a pendulum unit according to a fourth embodiment of the present disclosure.

Specifically, as shown in FIG. 4, the second magnetic body 2 comprises two permanent magnets 23 oppositely disposed, when in a static state, at two sides below the first magnetic body 1, wherein magnetic poles of the two permanent magnets 23 facing the first magnetic body 1 side are N pole and S pole, respectively.

It may be understood that by setting the magnetic poles of the same sides of the two permanent magnets 23 to be opposite to each other, irrespective of which direction of current is introduced into the first magnetic body 1, the first magnetic body 1 will surely obtain an acceleration towards the direction of one permanent magnet 23 thereof, which may simplify the control logic of the circuit.

Further, at least two strings 3 may be correspondingly connected to the first magnetic body 1, wherein a line B that connects connection points between the two strings 3 and the frame 4 is perpendicular to a line C that connects midpoints of the two permanent magnets 23.

Apparently, as shown in FIG. 4, when the line B that connects connection points between the two strings 3 and the frame 4 is perpendicular to the line C that connects midpoints of the two permanent magnets 23, a swinging direction of the first magnetic body 1 may be further restricted. In other words, the first magnetic body 1 swings back and forth constantly along a direction approximate to the connecting line C under the joint restriction of the string 3 and the two permanent magnets 23.

Compared with a structure of providing a revolving shaft or a pulley on one string 3, providing of two strings 3 not only enables sharing of the stresses on the connection points of the strings 3, but also lowers the requirement on the structural complexity of the connection points so as to reduce the cost.

Additionally, when the string 3 may conduct electricity, two strings 3 may provide a conductive connection between anode and cathode, respectively. Compared with connecting the positive and negative wires both to the inside of the same string 3, providing of the two strings 3 significantly alleviates the burden on the structure of the strings 3 and prolongs the service life of the strings 3. It is noted that the positive and negative wires of the power supply may also be arranged in a same string 3, which does not affect implementation of the technical objective of the present disclosure Additionally, the permanent magnets 23 preferably have a substantially elongated shape, and a length direction of the permanent magnets 23 is parallel to a direction of the line that connects the connection points between the two strings 3 and the frame 4. Similarly, the connection line direction of the permanent magnets 23 may be made substantially vertical to the direction of the line that connects the connection points between the two strings 3 and the frame 4, thereby restricting the motion trajectory of the first magnetic body 1 in the length direction of the permanent magnets 23. By virtue of the elongated magnet, the first magnetic body 1 may be better restricted within the magnetic field range of the permanent magnet 23, the motion trajectory of the first magnetic body 1 may be stabilized, and fatigue of the string 3 may be prevented due to constant change of stress directions and thus being pulled in a plurality of directions, thereby prolonging the service life.

Embodiment V

A fifth embodiment of the present disclosure provides a pendulum unit; the pendulum unit according to the fifth embodiment is a further improvement of the pendulum unit according to any of the first through fourth embodiments. In the fifth embodiment of the present disclosure, a preferred internal structure of the first magnetic body 1 is revealed.

Figure 5:
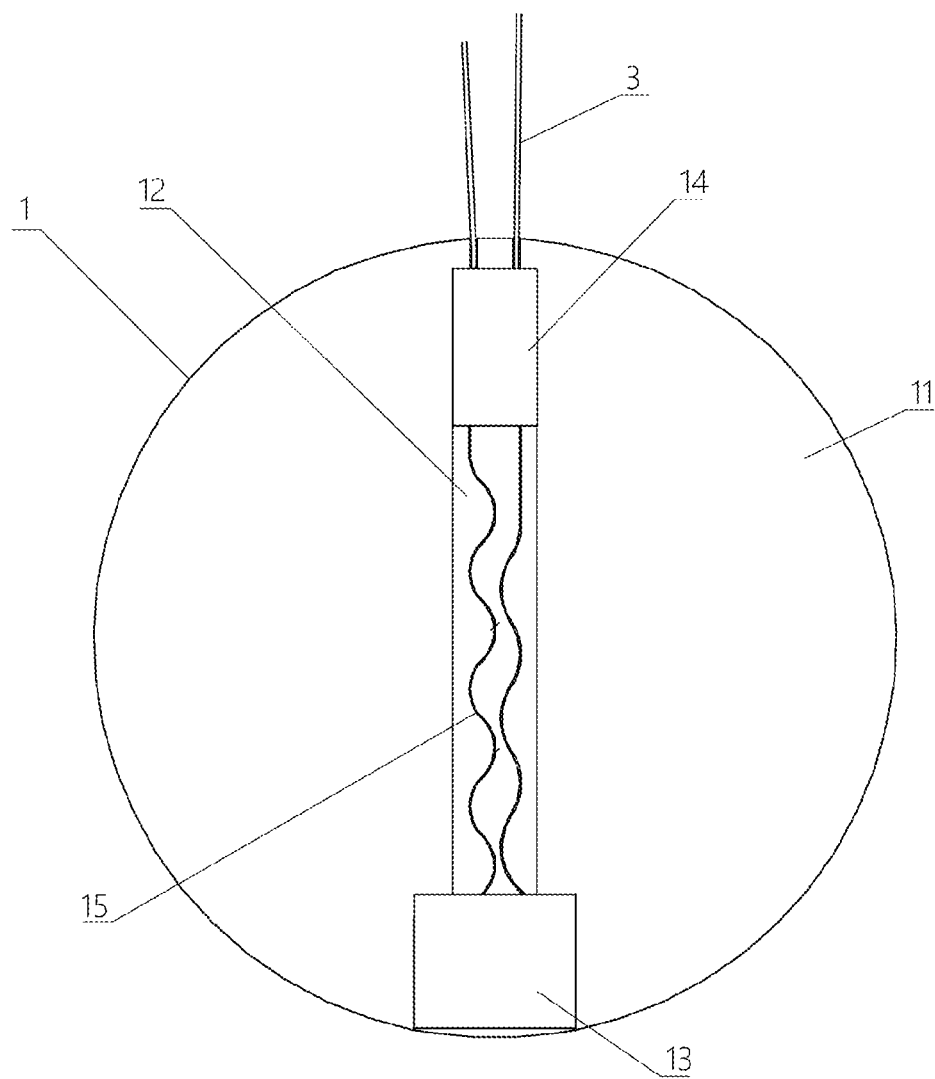
FIG. 5 is a sectional schematic view of a first magnetic body according to a fifth embodiment and an eighth embodiment of the present disclosure.

Specifically, as shown in FIG. 5, the first magnetic body 1 comprises:

a housing 11 in which a channel 12 is formed;

an electromagnetic device 13 accommodated in one side of the channel 12; and a wire connector 14 accommodated in the other side of the channel 12, a lead 15 of the electromagnetic device 13 being conductively connected to the wire connector 14 and electrically connected to the string 3 via the wire connector 14.

Preferably, the housing 11 is formed spherically, and the channel 12 passes through a center of the housing 11. The channel 12 passing through the center of the housing 11 has little impact on the gravitational center of the housing 11, such that it may mitigate the influence of the swinging first magnetic body 1.

Particularly, by arranging the electromagnetic device 13 and the wire connector 14 at two sides below the first magnetic body 1 using the channel 12, respectively, the electromagnetic device 13 may be as close as possible to the second magnetic body 2 to produce a larger magnetic action.

Preferably, a hole is formed on the housing 11, via which hole the string 3 is connected to the wire connector 14;

A portion of the housing 11 where the hole is formed may be used to block the wire connector 14 from leaving the channel 12. The wire connector 14 as provided plays a weight-bearing role under a pulling action of the string 3, which may prevent the lead 15 from being directly stressed, thereby prolonging the service life.

Preferably, a diameter of a portion of the channel 12 accommodating the electromagnetic device 13 is greater than a diameter of the remaining portions. If the diameter of the side where the electromagnetic device 13 is located is larger, the wire connector 14 and the electromagnetic device 13 may be mounted from that side, such that the portion of the housing 11 where the hole is formed still maintains integral with the remaining portions of the housing 11, which improves the structural strength of the housing 11.

The first magnetic body 1 may be mounted in the following steps:

1. penetrating the string 3 into the channel 12 via the hole and out of the other end of the channel 12;

2. connecting the out string 3 to the wire connector 14, and conductively welding the lead 15 to the string 3;

3. placing the wire connector 14 and the electromagnetic device 13 successively into the channel 12, such that the wire connector 14 is pulled to a terminal of the channel 12 via the string 3; wherein 4. at this point, the lead 15 is relaxed inside the channel 12; an end of the channel 12 where the electromagnetic device 13 is located may be blocked by a cover, thereby completing mounting of the first magnetic body 1.

The structure of the first magnetic body 1 in this embodiment sufficiently considers the arrangement of respective lines and the layout of the lead 15, which improves the tensile strength of the internal lines of the first magnetic body 1 and prolongs the service life of the first magnetic body 1.

Embodiment VI

A sixth embodiment of the present disclosure provides a pendulum unit; the pendulum unit according to the sixth embodiment is a further improvement of the pendulum unit according to any of the first through fifth embodiments. In the sixth embodiment of the present disclosure, a preferred length adjustable structure of the string 3 is revealed.

Figure 6:
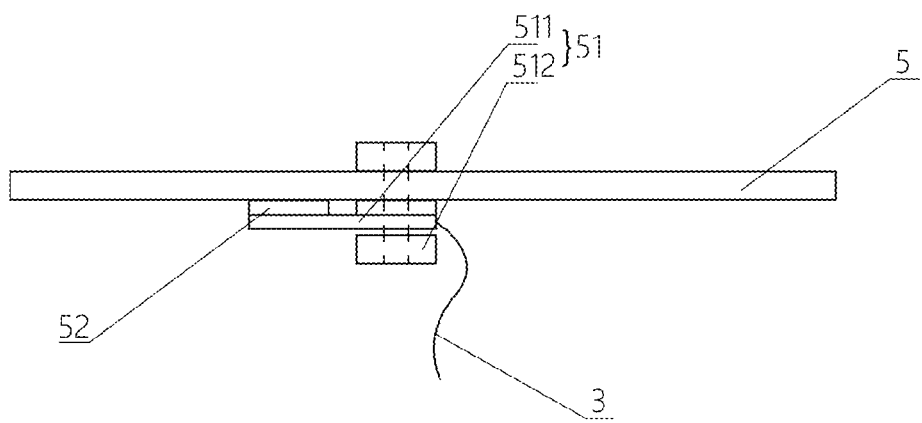
FIG. 6 is a schematic diagram of a pendulum unit where a line realignment device is located according to a sixth embodiment and a ninth embodiment of the present disclosure.

Referring to FIG. 6, in this embodiment, a conductive connector 5 is provided inside the frame; a line realignment device 51 is provided on the conductive connector 5, and the string 3 is connected to the line realignment device 51 and is electrically connected to the conductive connector 5 via the line realignment device 51.

Motion of a single first magnetic body 1 of the pendulum unit according to the present disclosure may be approximated as a simple pendulum motion. Based on a period formula of the simple pendulum:

$T=2\pi\sqrt{(L/g)}$, where T denotes the period, L denotes the length of the pendulum, and g denotes the local gravitational acceleration.

It is seen that by adjusting the length of the string 3 with the line realignment device 51, a motion period (i.e., motion frequency) of the first magnetic body 1 may be adjusted. Moreover, the swing amplitude may be controlled by adjusting the length of the string 3. Therefore, when the line realignment device is provided, the motion change patterns of the first magnetic body 1 may be enriched with the line realignment device 51.

Furthermore, a through hole and an electrically conductive contact 52 are provided on the conductive connector 5.

The line realignment device 51 comprises:

an electrically conductive reed 511 and a bolt-nut assembly 512, one end of the electrically conductive reed 511 being relatively fixed by the bolt-nut assembly 512 that penetrates through the through hole, the other end thereof abutting against the electrically conductive contact 52; wherein the string 3 is in electrical connection with the electrically conductive reed 511 via the nut-bolt assembly 512.

Specifically, the nut-bolt assembly 512 may include a combination of bolt, nut, and gasket, etc.; when the bolt penetrates through the conductive connector 5 and the electrically conductive reed 511, the string 3 wound around the bolt is in electrical connection with the electrically conductive reed 511 via a gasket through the connection between the nut and the bolt. The electrically conductive reed 511 is fixed to the circuit and meanwhile in interference-contact with the electrically conductive contact 52, such that the string 3 implements conduction with the conductive connector 5, further causing the string 3 to be conductive with the remaining portions of the pendulum unit.

Additionally, a receiving box may be provided such that the excessive portion of the string 3 is received inside the receiving box, to prevent the string 3 from aging or accidental contact.

The present disclosure further provides a method of adjusting the length of the string 3 adapted to the structure:

1. penetrating the bolt through the hole on the conductive connector 5, the bolt being relatively fixed using a first nut;
2. sleeving a first gasket on the bolt, winding the string 3 around the bolt, and adjusting the string 3 to a desired length;
3. sleeving the electrically conductive reed 511 on the bolt, causing the electrically conductive reed 511 to contact with the electrically conductive contact 52;
4. sleeving a second gasket on the bolt, and tightly fixing respective gaskets, string 3, and the electrically conductive reed 511 using a second nut, causing the electrically conductive reed 511 to interference-contact with the electrically conductive contact 52.

The length-adjustable structure of the string 3 provided in this embodiment may extend or withdraw a projected length of the string 3 as required and meanwhile maintain the electrically connection state of the string 3, providing a simple structure and a convenient manipulation. The user may adjust the swinging effect of the first magnetic body 1 by adjusting the projected length of the string 3 based on timing and needs, such that the pendulum unit in this embodiment provides a higher versatility.

Embodiment VII

A seventh embodiment of the present disclosure provides a wave pendulum assembly. The wave pendulum assembly according to the seventh embodiment comprises the pendulum unit according to any of the first through sixth embodiments.

Figure 7:
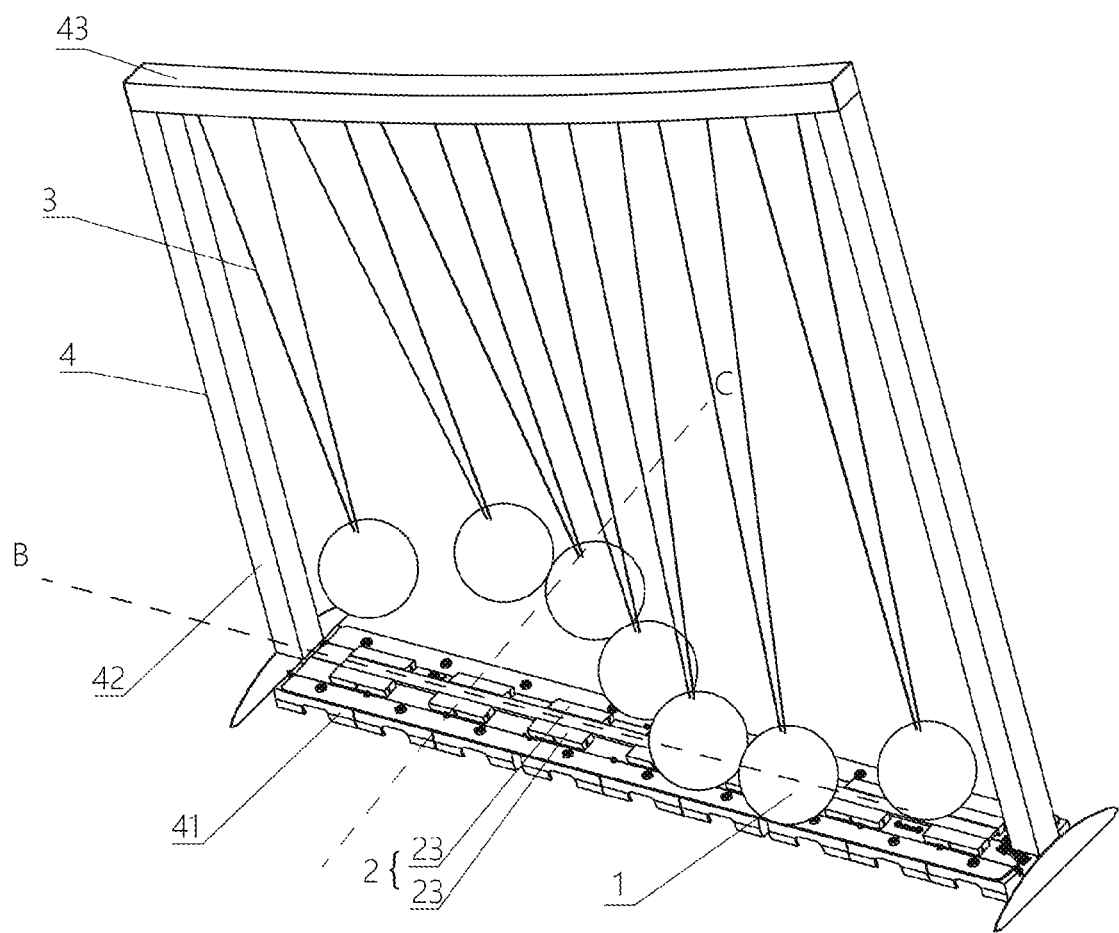
FIG. 7 is a top-view stereoscopic schematic diagram of a wave pendulum assembly according to a seventh embodiment of the present disclosure.

Specifically, as shown in FIG. 7, the wave pendulum assembly comprises:

a frame 4 and a plurality of first magnetic bodies 1, respective first magnetic bodies 1 being connected to the frame 4 via strings 3 and hung in the air; and second magnetic bodies 2, the amount of which is identical to that of the first magnetic bodies, the second magnetic bodies being fixedly disposed below the first magnetic bodies 1 in a one-to-one correspondence; wherein in the first magnetic bodies 1 and the second magnetic bodies 2, at least one party may generate magnetism when being energized, such that the first magnetic bodies 1 may swing periodically in the air under a magnetic action between the first magnetic bodies 1 and the second magnetic bodies 2.

In an embodiment, the frame 4 may preferably comprise:

a pedestal 41 on which the second magnetic bodies 2 are disposed;

a beam 43 disposed above the pedestal 41, wherein the first magnetic bodies 1 are connected to the beam 43 via the strings 3; and a support pillar 42 that is connected to the pedestal 41 to support the beam 43.

The pedestal 41 may be formed with a housing into which the second magnetic bodies 2 are accommodated. The frame 4 as provided may form a support to the wave pendulum assembly, for the first magnetic bodies 1 to swing.

To simplify configuration of the gravitational center of a first magnetic body 1, the first magnetic body 1 may be formed as a spherical body or a regular polyhedron. When the spherical shape is adopted, an air friction subjected to the first magnetic body 1 may also be reduced. Of course, to provide more versatile user experience, the first magnetic body 1 may also assume some other irregular shapes, which does not constitute a limitation to the technical object of the present disclosure.

In an embodiment of the present disclosure, a source for generating an initial force of pushing the first magnetic body 1 to motion may be the magnetism generated by the second magnetic body 2 when being energized, or the magnetism generated by the first magnetic body 1 when being energized.

Preferably, in this embodiment, the string 3 may conduct electricity, such that the first magnetic body 1 may generate magnetism when being energized.

Particularly, the string 3 may conduct electricity via an electrically conductive cable inside the string 3 or may be directly made of an electrically conductive material. For example, the string 3 may be directly made of steel, copper or some metal alloy materials.

By conductively connecting the string 3 to an external battery, a weight of the first magnetic body 1 may be reduced, the internal structure of the first magnetic body 1 may be simplified, and the cost may be lowered.

It is particularly noted that generally, when it is needed to generate magnetism, it is always conceived to cause the second magnetic bodies 2 to generate magnetism when being energized, the first magnetic bodies 1 are configured as permanent magnets. This may simplify the structure of the first magnetic body 1. When the first magnetic body 1 is constantly in a motion state, a simpler structure may cause the pendulum unit to be manufactured more easily.

However, this arrangement is more suitable for a circumstance that the pendulum unit is a small-sized pendulum. To adapt the pendulum unit to a large-sized pendulum, a second magnetic body 2 including two electromagnets needs to be provided, or a structure of the joint between the first magnetic body 1 and the frame 4 needs to be changed, e.g., configuring the joint structure as a revolving shaft, so as to enable the first magnetic body 1 to implement a pendulum motion. Particularly, in the pendulum assembly, when a plurality of pendulum units are provided, configuring of two electromagnets will cause the cost to rise dramatically; besides, when a plurality of electromagnets are provided in a same plane, mutual interference between the electromagnets and circuit control problems may arise; while the joint structure is arranged as a revolving shaft, it is relatively demanding on the bearing capacity of the revolving shaft structure, which will undoubtedly increase the cost.

However, an embodiment of the present disclosure innovatively causes the first magnetic bodies 1 to generate magnetism when being energized, where the first magnetic bodies 1 are used as electromagnets that may generate magnetism when being energized, and current is conducted via the string 3. Because it is not needed to arrange a battery on the first magnetic bodies 1, the structure of the first magnetic bodies 1 is simplified. Further, as it is only needed to arrange an electromagnet on the first magnetic bodies 1 and the first magnetic bodies 1 and the frame may be connected arbitrarily, the structure is significantly simplified, the cost is lowered, and the service life is prolonged.

Particularly, the pendulum assembly may further comprise a power supply module, the power supply module supplying power to power-consuming components of the pendulum assembly through any one of solar energy, wind energy, grid power or a combination thereof.

Figure 8:
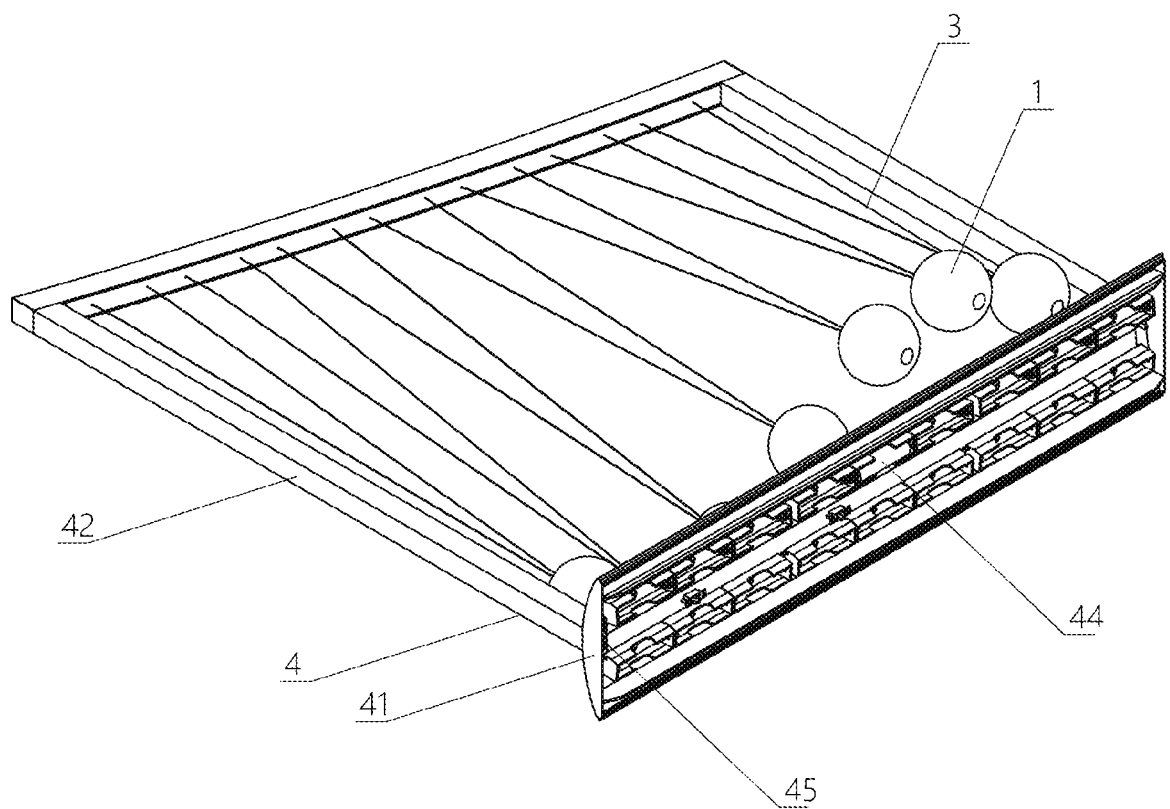
FIG. 8 is a bottom-view stereoscopic schematic diagram of a wave pendulum assembly according to the seventh embodiment of the present disclosure.

For example, a battery module may be arranged inside the pendulum assembly and a solar panel may be arranged on the top thereof, such that in fine days, the power generated by the solar energy actuates the first magnetic body 1 to motion and meanwhile charges the battery module, while in rainy days, the battery module discharges to actuate the first magnetic body 1 to motion. When connected to the grid power, the extra generating capacity of the solar panel may also be integrated into the grid power to enhance energy utilization Preferably, as shown in FIG. 8, the wave pendulum assembly may further comprise:

a battery compartment 44 disposed in the pedestal 41, for accommodating a battery module; and a cable 45 electrically connected to the battery module and a string 3, the cable 45 being at least partially disposed inside a support pillar 42.

Particularly, the battery may be a lithium battery, a dry battery, or some other common batteries; further, a battery compartment 44 may be provided inside the frame 4, particularly inside the pedestal 41 of the frame 4, wherein the battery is disposed inside the battery compartment 44. By disposing the battery in the pedestal 41, it is beneficial for reasonable counterweight arrangement of the wave pendulum assembly to prevent the wave pendulum assembly from toppling.

In this embodiment, a more appropriate layout of the permanent magnets is further provided.

Specifically, as shown in FIG. 7, the second magnetic body 2 comprises two permanent magnets 23 oppositely disposed, in a stationary state, at two sides below the first magnetic body 1, and the magnetic poles of the two permanent magnets 23 facing the first magnetic body 1 side are N pole and S pole, respectively.

It may be understood that by setting the magnetic poles of the two permanent magnets 23 at the same side to be opposite to each other, irrespective of which direction of current is introduced into the first magnetic body 1, the first magnetic body 1 will surely obtain an acceleration towards the direction of one permanent magnet 23 thereof, such that the control logic of the circuit may be simplified.

Further, at least two strings 3 may be correspondingly connected to the first magnetic body 1, wherein a line B that connects connection points between the two strings 3 and the frame 4 is perpendicular to a line C that connects midpoints of the two permanent magnets 23.

Apparently, as shown in FIG. 7, when the line B that connects connection points between the two strings 3 and the frame 4 is perpendicular to the line C that connects midpoints of the two permanent magnets 23, a swinging direction of the first magnetic body 1 may be further restricted. In other words, the first magnetic body 1 will swing back and forth constantly along a direction approximate to the connecting line C under the joint restriction of the string 3 and the two permanent magnets 23.

Compared with a structure of providing a revolving shaft or a pulley on one string 3, providing of two strings 3 not only enables sharing of the stresses on the connection points of the strings 3, but also lowers the requirement on the structural complexity of the connection points so as to reduce the cost.

Additionally, when the string 3 may conduct electricity, two strings 3 may provide a conductive connection between anode and cathode, respectively. Compared with connecting the positive and negative wire both to the inside of the string 3, providing of two strings 3 significantly alleviates the burden to the structure of the string 3 and extends the service life of the string 3.

Additionally, the permanent magnets 23 preferably have a substantially elongated shape, and a length direction of the permanent magnets 23 is parallel to a direction of the line that connects connection points between the two strings 3 and the frame 4. Similarly, the connection line direction of the permanent magnets 23 may be made substantially vertical to the direction of the line that connects the connection points between the two strings 3 and the frame 4, thereby restricting the motion trajectory of the first magnetic bodies 1 in the length direction of the permanent magnets 23. By virtue of the elongated magnets, the first magnetic bodies 1 may be better restricted within the magnetic field range of the permanent magnets 23, the motion trajectory of the first magnetic bodies 1 may be stabilized, and fatigue of the strings 3 may be prevented due to constant change of stress directions and thus being pulled in a plurality of directions, thereby prolonging the service life.

It is noted that the wave pendulum assembly according to an embodiment of the present disclosure may control the circuit via an external control circuit, or may comprise a control circuit in itself, wherein the control circuit may comprise:

a converter module that is electrically connected to a second magnetic body 2;

and a control module that is in communicative connection with the converter module.

Particularly, the control module may change the current in the first magnetic body 1 and/or the second magnetic body 2 through a preset control logic.

Specifically, the manner of changing the current includes, but is not limited to, changing the current magnitude and/or current direction, such that automatic control of the pendulum assembly may be flexibly implemented.

Further, a storage module may be provided. The storage module is in communication with the control module and may be used for storing the control logic. By loading the control logic into the storage module, the user may autonomously edit or adapt the swing style of the first magnetic body 1, such that the pendulum assembly may provide more fun to play, thereby improving user experience. Specifically, a plurality of "swinging modes" may be pre-stored in the memory module, and the user may select and play these "swinging modes" based on his/her preferences, thereby achieving a desired motion effect.

This embodiment may change the arrangement style created by respective first magnetic bodies 1 by controlling different swinging time sequences of the first magnetic bodies 1. For example, the initial timing for swinging of the first magnetic bodies 1 may be delayed at a preset interval in sequence, such that respective first magnetic bodies 1 form a wave-like swinging style shown in FIG. 7; for another example, by introducing currents of different directions into the first magnetic bodies 1 at odd-number positions and the first magnetic bodies at even-number positions, the respective neighboring first magnetic bodies 1 may swing in different directions. The control module may switch between different control logics, such that the swinging manners of the first magnetic bodies 1 become richer and more versatile, further improving the fun of viewing the wave pendulum assembly.

Additionally, the wave pendulum assembly may further comprise a music module in communicative connection with the control module. The music module may play music, and may further play the music stored in a memory module; while the control module may adjust the swinging state of each first magnetic body 1 through the played music, such that swinging of the first magnetic body 1 may be in tune with the music, thereby promoting the pleasure of watching.

In the present disclosure, swing of respective first magnetic bodies 1 is controlled by energizing, which further implements automatic control of the pendulum module.

Compared with the prior art where the swing is actuated by manually pushing the swinging spheres, the present disclosure needs no repeated manual intervention to realize long-time and uninterrupted motion of the first magnetic bodies, thereby enhancing the convenience. Moreover, compared with pushing the motion of the first magnetic body 1 through mechanical transmission, the present disclosure only needs to arrange a pair of mutually cooperating magnetic bodies, so that multiple variations of motion speeds and motion patterns may be realized by simple electrical control, which reduces the structural complexity to a great extent, and provides a more convenient implementation, a lower cost, a longer service life, and higher robustness.

Moreover, by controlling the magnitude of current upon energizing, the pendulum assembly of the present disclosure may autonomously change the amplitude, frequency, and direction of the motion of each first magnetic body 1, thereby forming more interesting swinging patterns, so that the motion procedure of the pendulum assembly is not dull, a better effect of fatigue relief and pressure alleviation is implemented, and its appeal is enhanced.

Embodiment VIII

An eighth embodiment of the present disclosure provides a wave pendulum assembly; the wave pendulum assembly according to the eighth embodiment is a further improvement of the wave pendulum assembly according to the seventh embodiment. In the eighth embodiment of the present disclosure, a preferred internal structure of the first magnetic body 1 is revealed.

Specifically, as shown in FIG. 8, the first magnetic body 1 comprises:

a housing 11 in which a channel 12 is formed;

an electromagnetic device 13 accommodated in one side of the channel 12; and a wire connector 14 accommodated in the other side of the channel 12, a lead 15 of the electromagnetic device 13 being conductively connected to the wire connector 14 and electrically connected to the string 3 via the wire connector 14.

Preferably, the housing 11 is formed spherically, and the channel 12 passes through a center of the housing 11. The channel 12 passing through the center of the housing 11 may balance the gravitational center of the housing 11, thereby mitigating the influence of the swinging first magnetic body 1.

Particularly, by arranging the electromagnetic device 13 and the wire connector 14 at two sides below the first magnetic body 1 using the channel 12, respectively, the electromagnetic device 13 may be as close as possible to the second magnetic body 2 a to produce a larger magnetic force.

Preferably, a hole is formed on the housing 11, via which hole the string 3 is connected to the wire connector 14;

A portion of the housing 11 where the hole is formed may be used to prevent the wire connector 14 from leaving the channel 12. The wire connector 14 as provided plays a role of bearing the string 3, which may prevent the lead 15 from being directly stressed, thereby prolonging the service life.

Preferably, a diameter of a portion of the channel 12 accommodating the electromagnetic device 13 is greater than a diameter of the remaining portions. If the diameter of the side where the electromagnetic device 13 is located is larger, the wire connector 14 and the electromagnetic device 13 may be mounted from that side, such that the portion of the housing 11 where the hole is formed still maintains integral with the remaining portions of the housing 11, which improves the structural strength of the housing 11.

The first magnetic body 1 may be mounted in the following steps:

1. penetrating the string 3 into the channel 12 via the hole and out of the other end of the channel 12;

2. connecting the out string 3 to the wire connector 14, and conductively welding the lead 15 to the string 3;

3. placing the wire connector 14 and the electromagnetic device 13 successively into the channel 12, such that the wire connector 14 is pulled to a terminal of the channel 12 via the string 3; wherein 4. at this point, the lead 15 is relaxed inside the channel 12; an end of the channel 12 where the electromagnetic device 13 is located may be blocked by a cover, thereby completing mounting of the first magnetic body 1.

The structure of the first magnetic body 1 in this embodiment sufficiently considers the arrangement of respective lines and the layout of the lead 15, which improves the tensile strength of the internal lines of the first magnetic body 1 and prolongs the service life of the first magnetic body 1.

Embodiment IX

A ninth embodiment of the present disclosure provides a wave pendulum assembly; the wave pendulum assembly according to the ninth embodiment is a further improvement of the wave pendulum assembly according to the seventh or eighth embodiment. In the ninth embodiment of the present disclosure, a preferred length-adjustable structure of a string 3 is revealed.

Referring to FIG. 6, in this embodiment, a conductive connector 5 is provided inside the frame; a line realignment device 51 is provided on the conductor connector 5, and the string 3 is connected to the line realignment device 51 and is electrically connected to the conductor connector 5 via the line realignment device 51.

Motion of a single first magnetic body 1 of the pendulum assembly according to the present disclosure may be approximated as a simple pendulum motion. Based on a period formula of simple pendulum:

$T=2\pi\sqrt{(L/g)}$ where T denotes the period, L denotes the length of the pendulum, and g denotes the local gravitational acceleration, it is seen that by adjusting the length of the string 3 with the line realignment device 51, a motion period (i.e., motion frequency) of the first magnetic body 1 may be adjusted. Moreover, the swing amplitude may be controlled by adjusting the length of the string 3. Therefore, when the line realignment device is provided, the motion change patterns of the first magnetic body 1 may be enriched through the line realignment device 51.

Furthermore, a through hole and an electrically conductive contact 52 are provided on the conductive connector 5.

The line realignment device 51 comprises:

an electrically conductive reed 511 and a bolt-nut assembly 512, one end of the electrically conductive reed 511 being relatively fixed by the bolt-nut assembly 512 that penetrates through the through hole, the other end thereof abutting against the electrically conductive contact 52; wherein the string 3 is in electrical contact with the electrically conductive reed 511 via the nut-bolt assembly 512.

Specifically, the nut-bolt assembly 512 may include a combination of bolt, nut, and gasket, etc.; when the bolt penetrates through the conductive connector 5 and the electrically conductive reed 511, the string 3 wound around the bolt is in electrical contact and conduction with the electrically conductive reed 511 via a gasket through the connection between the nut and the bolt. While the electrically conductive reed 511 is fixed to the circuit, it is in interference-contact with the electrically conductive contact 52, such that the string 3 implements conduction with the conductive connector 5, further causing the string 3 to be conductive with the remaining portions of the pendulum assembly.

Additionally, a receiving box may be provided such that the excessive portion of the string 3 is received inside the receiving box, to prevent the string 3 from aging or accidental contact.

The present disclosure further provides a method of adjusting the length of the string 3 adapted to the structure:

1. penetrating the bolt through the hole on the conductive connector 5, the bolt being relatively fixed using a first nut;

2. sleeving a first gasket on the bolt, winding the string 3 around the bolt, and adjusting the string 3 to a desired length;

3. sleeving the electrically conductive reed 511 on the bolt, causing the electrically conductive reed 511 to contact with the electrically conductive contact 52;

4. sleeving a second gasket on the bolt, and tightly fixing respective gaskets, string 3, and the electrically conductive reed 511 using a second nut, causing the electrically conductive reed 511 to interference-contact with the electrically conductive contact 52.

The length-adjustable structure of the string 3 provided in this embodiment may extend or withdraw a projected length of the string 3 as required and meanwhile maintain the electrically connection state of the string 3, providing a simple structure and a convenient manipulation. The user may adjust the swinging effect of the first magnetic body 1 by adjusting the projected length of the string 3 based on timing and needs, such that the wave pendulum assembly in this embodiment provides a higher versatility.

Embodiment X

Figure 9:
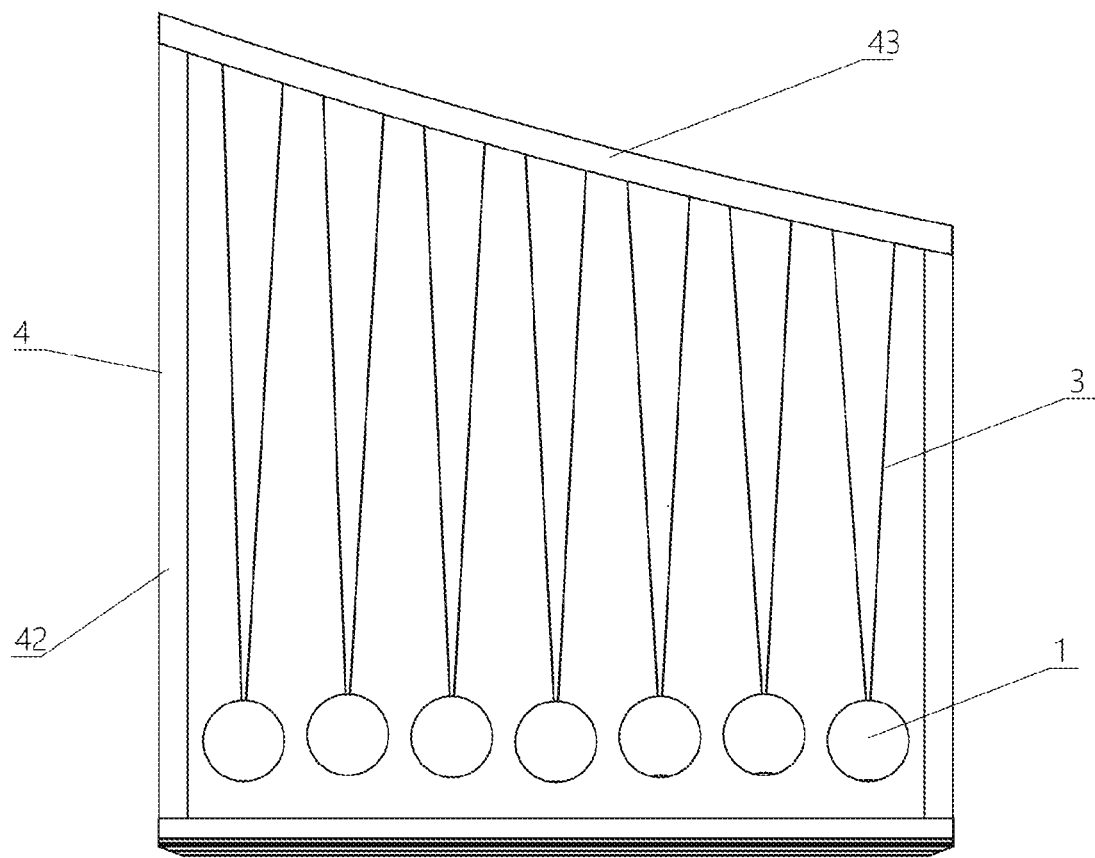
FIG. 9 is a front-view schematic diagram of a wave pendulum assembly having dual support pillars according to a tenth embodiment of the present disclosure.

A tenth embodiment of the present disclosure provides a wave pendulum assembly; the wave pendulum assembly according to the tenth embodiment is a further improvement of the wave pendulum assembly according to any of the seventh through tenth embodiments. In the tenth embodiment of the present disclosure, as shown in FIG. 9, the frame 4 comprises:

a beam 43, wherein the first magnetic body 1 is connected to the beam 43 via the string 3; and a height of the beam 43 gradually ascends from one side to the other side, and heights of the plurality of first magnetic bodies 1 are substantially consistent.

When the beam 43 is not a horizontal beam 43, height change of the beam 43 is represented by a change of the length of the strings 3 connected with the first magnetic bodies 1 which are maintained at the same height. This change will influence the factors such as the swing amplitude of the wave pendulum, the linear velocity of swing, and swing period, etc. In one wave pendulum assembly, versatile motion states of the first magnetic bodies may be exhibited via height changes of the beam 43, which improves the versatility of pendulum motion, thereby preventing the user from suffering from a fatigue visual experience, further improving the appeal for viewing .

Particularly, the height of the beam 43 may linearly ascend from one side to the other side, or gradually ascend non-linearly. When the height of the beam 43 ascends non-linearly, i.e., when the beam 43 has a certain curvature, more versatile changes are provided, thereby offering a higher appeal of viewing and a better effect of pressure relief. Additionally, the beam 43 may be further configured into a shape at least part of which is actuate, even a shape of wave as a whole, thereby improving the richness of variations.

Figure 10:
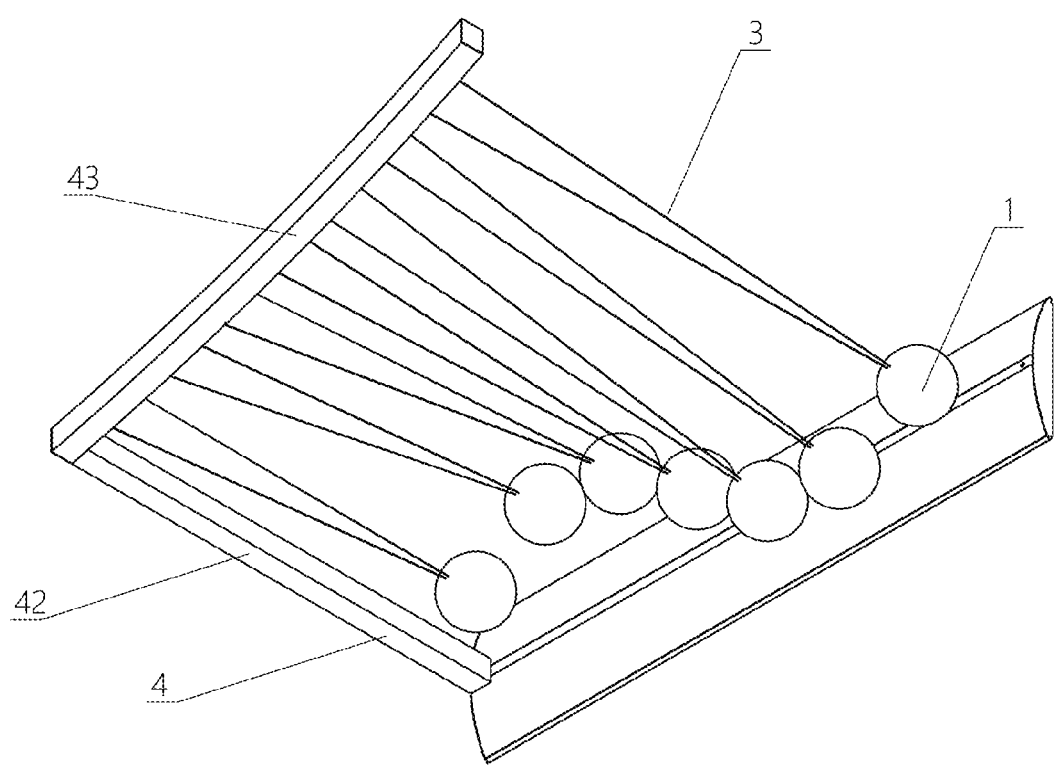
FIG. 10 is a stereoscopic schematic diagram of the wave pendulum assembly having a single support pillar according to the tenth embodiment of the present disclosure.

Further, in an embodiment of the present disclosure, a shape of the frame 4 may have a plurality of variations. Typically, as shown in FIG. 9, the support pillar 42 may be provided in two, the two support pillars 42 being correspondingly arranged at two sides of the pendulum assembly; while as shown in FIG. 10, the support pillar 42 may also be provided in one and arranged at a single side. There may further be more variations. For example, two or more rows of pendulum units are arranged in the pendulum assembly, and preset styles such as patterns and texts may be presented by swinging of pendulum units, wherein the beam 43 and the support pillar 42 may be integrally formed or separately connected, which do not affect implementation of the technical object of the present disclosure.

Those skilled in the art may adopt more specific transformed structures according to actual conditions. It should be understood that any transformations of the technical solutions of the present disclosure should fall within the protection scope of the present disclosure.

It should be understood that the terms used in the embodiments of the present disclosure are only for the purpose of describing preferred embodiments, rather than limiting the present disclosure. The singular form "a," "an," or "the" used in the embodiments and appended claims of the present disclosure is also intended to include plurality; unless otherwise clearly specified in the context, "plurality" generally includes at least two, but does not exclude a circumstance of at least one.

It should be understood that, the term "and/or" used herein only describes an association between correlated objects, which indicates that three kinds of relationships may exist. For example, A and/or B may indicate: only A exists, both A and B exist, and only B exists. Additionally, the symbol "/" in the context generally indicates an "or" relationship between the former object and the latter associated object.

It should be understood that although terms such as first, second, and third may be used in the embodiments of the present disclosure to describe some components, such components should not be limited only to these terms. These terms are only used for distinguishing various components. For example, without departing from the scope of the embodiments of the present disclosure, a first certain component may also be referred to as a second certain component; similarly, the second certain component may also be referred to the first certain component.

In the embodiments of the present disclosure, phrases such as "substantially equal to," "substantially perpendicular to," and "substantially symmetrical to" mean that the two referred to features are very close to the described relationship in terms of a macro size or a relative positional relationship. However, it is clear to those skilled in the art that due to objective factors such as errors and tolerances, the positional relationship between objects can hardly be exactly constrained when it comes to a minor scale or a microscopic angle. Even the size and positional relationships therebetween have a minor error, implementation of the technical effect of the present disclosure will not be materially affected.

It needs also be noted that the terms "include," "comprise" or any other variables intend for a non-exclusive inclusion, such that a product or system including a series of elements not only includes those elements, but also includes other elements that are not explicitly specified or further includes the elements inherent in the product or system. Without more restrictions, an element limited by the phase "including one . . . " does not exclude a presence of further equivalent elements in the product or system including the elements.

In various embodiments above, although the method is illustrated and described as a series of actions to simplify the understanding, a person of normal skill in the art should understand and appreciate that the method is not limited by the sequence of actions, because according to one or more embodiments, some actions may occur in accordance with different sequences and/or correctly occur with other actions illustrated and described herein or those that, although not illustrated and described herein, may be understood by those skilled in the art.

Those skilled in the art may understand, the information, signal and data may be represented by any technology or technique among various technologies and techniques. For example, the data, instructions, commands, information, signals, bits, code elements, chips may be represented by voltage, current, electromagnetic wave, magnetic field or magnetic particles, optical field or optical particles, or any combination of the above.

Those skilled in the art will further appreciate that various explanatory logic sections, modules, units, circuits and algorithm steps described in conjunction with the embodiments disclosed herein may be implemented as electronic hardware, computer software, or a combination thereof. To clearly explain this interchangeability between hardware and software, various explanatory components, blocks, modules, units, circuits, and steps are generally described above in a functional way. Whether such functionalities are implemented as hardware or software is dependent on their specific applications and design constraints imposed on the overall system. For each particular application, those skilled in the art may implement the described functionality by different means, but such implementation decisions should not be interpreted as a cause of departing from the scope of the present disclosure.

Finally, it should be noted that those of normal skill in the art may understand that many technical details provided in the various embodiments above are only for the readers to understand better. However, the technical solutions as claimed in the claims of the present disclosure may be still implemented substantially even without these technical details or various changes and modifications of the embodiments above. Therefore, in actual applications, various alternations to the embodiments may be done in aspects of forms and details without departing from the spirit and scope of the present disclosure.

What is claimed is:

1. A pendulum unit, comprising:
    a frame;
    a first magnetic body, the first magnetic body being connected to the frame via a string and being hung in the air, wherein the string is electrically conductive; and
    a second magnetic body fixedly disposed below the first magnetic body; wherein the first magnetic body may swing periodically in the air under a magnetic action between the first magnetic body and the second magnetic body,
    wherein the first magnetic body comprises:
        a housing in which a channel having a first side and a second side is formed, wherein the channel passes through a center of the housing;
        an electromagnetic device that is received in the first side of the channel; and
        a wire connector that is received in the second side of the channel, wherein a lead of the electromagnetic device is conductively connected to the wire connector and electrically connected to the string via the wire connector.

2. The pendulum unit according to claim 1, wherein a hole is formed on the housing, via which hole the string is connected to the wire connector;
    wherein a diameter of a part of the channel for receiving the electromagnetic device is larger than that of another part of the channel not receiving the electromagnetic device;
    wherein the housing is formed spherically, and the channel passes through a center of the housing.

3. The pendulum unit according to claim 1, wherein the second magnetic body comprises two permanent magnets oppositely disposed at two sides below the first magnetic body when the first magnetic body is in a stationary state, wherein magnetic poles of the sides of the two permanent magnets facing the first magnetic body are N pole and S pole, respectively.

4. The pendulum unit according to claim 3, wherein the first magnetic body is correspondingly connected with two strings to the frame at two connection points on the frame, an imaginary line that connects the connection points is perpendicular to an imaginary line that connects midpoints of the two permanent magnets;
    wherein the permanent magnets have an elongated shape, and a length direction of the permanent magnets is parallel to the imaginary line that connects the connection points on the frame.

5. The pendulum unit according to claim 1, wherein a conductive connector is provided in the frame, a line realignment device is provided on the conductive connector, and the string is connected to the line realignment device and is electrically connected to the conductive connector via the line realignment device.

6. The pendulum unit according to claim 5, wherein a through hole and an electrically conductive contact are provided on the conductive connector; and
    the line realignment device comprises:
        an electrically conductive reed and a bolt-nut assembly, one end of the electrically conductive reed being relatively fixed by the bolt-nut assembly that penetrates through the through hole, the other end abutting against the electrically conductive contact; wherein the string is in electrical contact with the electrically conductive reed via the bolt-nut assembly.

7. The pendulum unit according to claim 1, wherein the frame comprises:
a pedestal on which the second magnetic body is disposed;
a beam disposed above the pedestal, wherein the first magnetic body is connected to the beam via the string; and
a support pillar that is connected to the pedestal and supports the beam.

8. The pendulum unit according to claim 1, further comprising:
a power supply module, the power supply module supplying power to power-consuming components of the pendulum unit through any one of solar energy, wind energy, grid power or a combination thereof.

9. The pendulum unit according to claim 8, further comprising:
a control circuit, the control circuit comprising:
a converter module that is electrically connected to the first magnetic body;
a control module that is in communicative connection with the converter module; and
a storage module that is in communicative connection with the control module;
wherein
the control module is configured for loading a control logic from the storage module and controlling the converter module based on the control logic to change a current magnitude and/or a current direction inside the first magnetic body and/or the second magnetic body.

10. A wave pendulum assembly, comprising:
a frame;
a plurality of first magnetic bodies, respective first magnetic bodies being connected to the frame via strings and being hung in the air, wherein the strings are electrically conductive; and
a plurality of second magnetic bodies, the amount of which is identical to that of the first magnetic bodies, the second magnetic bodies being fixedly disposed below the first magnetic bodies in a one-to-one correspondence; wherein
the first magnetic bodies may periodically swing in the air under a magnetic interaction between the first magnetic bodies and the second magnetic bodies,
wherein each of the first magnetic bodies comprises:
a housing in which a channel having a first side and a second side is formed, wherein the channel passes through a center of the housing;
an electromagnetic device accommodated in the first side of the channel; and
a wire connector accommodated in the second side of the channel, a lead of the electromagnetic device being conductively connected to the wire connector and electrically connected to the string via the wire connector.

11. The wave pendulum assembly according to claim 10, wherein the frame comprises:
a beam, wherein the first magnetic bodies are connected to the beam via the strings; and
a height of the beam gradually ascends from one side to the other side, and heights of the plurality of first magnetic bodies are consistent;
wherein a height of the beam gradually ascends non-linearly from one side to the other side.

12. The wave pendulum assembly according to claim 10, further comprising a control circuit, the control circuit comprising:
converter modules, the amount of which is identical to that of the first magnetic bodies, the converter modules being electrically connected to the first magnetic bodies in a one-to-one correspondence;
a control module that is in communicative connection with each converter module, respectively; and
a storage module that is in communicative connection with the control module; wherein the control module is configured for loading a control logic from the storage module and controlling the converter modules based on the control logic to change current inside the first magnetic bodies and/or the second magnetic bodies.

13. The pendulum unit according to claim 10, wherein a hole is formed on the housing, via which hole the string is connected to the wire connector;
wherein a diameter of a portion of the channel accommodating the electromagnetic device is greater than a diameter of other portions thereof;
wherein the housing is formed spherically, the channel penetrating through a center of the housing.

14. The wave pendulum assembly according to claim 10, wherein the second magnetic body comprises two permanent magnets oppositely disposed at two sides of the first magnetic body when the first magnetic body is in a stationary state, and magnetic poles of the two permanent magnets facing the first magnetic body side are N pole and S pole, respectively;
wherein the first magnetic body is correspondingly connected with two strings to the frame at two connection points on the frame, and an imaginary line that connects the two connection points on the frame is perpendicular to an imaginary line connecting the midpoint points of the two permanent magnets;
wherein the permanent magnet has an elongated shape, a length direction of the permanent magnet being parallel to the imaginary line that connects the two connection points on the frame.

15. The wave pendulum assembly according to claim 10, wherein a wire conductor is arranged in the frame, a line realignment device is arranged on the wire connector, and the string is connected to the line realignment device and electrically connected to the conductive connector via the line realignment device;
wherein a through-hole and an electrically conductive contact are provided on the conductor connector; and
the line realignment device comprises:
an electrically conductive reed and a bolt-nut assembly, one end of the electrically conductive reed being relatively fixed by the bolt-nut assembly that penetrates through the through hole, and the other end thereof being abutting against the electrically conductive contact; and
the string is electrically connected to the electrically conductive reed via the bolt-nut assembly.

16. The pendulum wave assembly according to claim 10, further comprising:
a power supply module, the power supply module supplying power to power-consuming components of the pendulum unit through any one of solar energy, wind energy, grid power or a combination thereof.

17. The pendulum wave assembly according to claim 10, wherein the frame comprises:
a pedestal on which the second magnetic body is disposed;

a beam disposed above the pedestal, wherein the first magnetic body is connected to the beam via the string; and a support pillar connected on the pedestal to support the beam.

\* \* \* \* \*